(12) United States Patent
Schaffer

(10) Patent No.: US 6,189,661 B1
(45) Date of Patent: Feb. 20, 2001

(54) ELECTROMECHANICAL BRAKE

(75) Inventor: Wolfram Schaffer, Asperg (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/242,013

(22) PCT Filed: May 16, 1997

(86) PCT No.: PCT/DE97/00990

§ 371 Date: Feb. 5, 1999

§ 102(e) Date: Feb. 5, 1999

(87) PCT Pub. No.: WO98/05881

PCT Pub. Date: Feb. 12, 1998

(30) Foreign Application Priority Data

Aug. 5, 1996 (DE) .............................................. 196 31 592

(51) Int. Cl.$^7$ .................................................... F16D 65/36
(52) U.S. Cl. ......................................... 188/157; 188/72.8
(58) Field of Search .................................. 188/162, 157, 188/72.1, 72.8, 73.34, 370

(56) References Cited

U.S. PATENT DOCUMENTS

| 3,952,844 | * | 4/1976 | Newstead et al. | 188/72.8 |
| 4,374,551 | * | 2/1983 | Birkenbach et al. | 188/71.9 |
| 4,721,190 | * | 1/1988 | Schmidt et al. | 188/71.9 |
| 5,090,518 | * | 2/1992 | Schenk et al. | 188/72.1 |
| 5,788,023 | * | 8/1999 | Schoner et al. | 188/72.7 |
| 5,788,024 | * | 8/1998 | Meyer | 188/72.7 |
| 5,931,268 | * | 8/1999 | Kingston et al. | 188/162 |

* cited by examiner

Primary Examiner—Robert J. Oberleitner
Assistant Examiner—Devon Kramer
(74) Attorney, Agent, or Firm—Ronald E. Greigg; Edwin E. Greigg

(57) ABSTRACT

The invention concerns an electromechanical brake, in particular a disc brake (10), comprising a brake pad (14) which can be urged against a brake disc (16) by means of an electromotive actuating arrangement (18). According to the invention, in order to be able to release the brake (10) in the event of an electronic component failing, for example, a releasable support device (42) supports the actuating arrangement (18) on a brake calliper (12) when the brake pad (14) is urged against the brake disc (16). In order to release the support device (42), its distance from the brake disc (16) is increased such that the actuating arrangement (18) and together therewith the brake pad (14) are released from the brake disc (16).

15 Claims, 2 Drawing Sheets

ELECTROMECHANICAL BRAKE

BACKGROUND OF THE INVENTION

The invention relates to an electromechanically actuatable brake.

One such brake is known from International Patent Disclosure 96/03301. To press a brake lining against a rotating brake body (brake disk, brake drum or the like), the known brake has an actuation device with a roller thread drive, which can be driven by an electric motor. Both tightening and releasing the known brake are accomplished with the electric motor. In the event of failure, such as failure of an electronic control unit of the brake during braking, to prevent residual braking moments caused by hysteresis on the part of the actuating unit from affecting the brake body, a preferably spiral restoring spring is provided in a feature of the known brake. The spiral restoring spring engages the actuating unit and drives the actuating unit to rotate along with the electric motor in the releasing direction, so that the brake lining is lifted away from the brake body.

This brake has the disadvantage that when brake pressure is being built up, the force of the restoring spring has to be overcome as well, and to that end, the electric motor has to be correspondingly larger and supplied with greater current. There is also a dynamic loss and a worsening of efficiency.

A further disadvantage is that to keep a built-up brake force constant, the electric motor has to be supplied so strongly with current that it keeps the brake lining pressed against the brake body at a constant contact pressure, counter to the force of the restoring spring, which attendant thermal problems. A further factor is that the known brake cannot be used as a parking brake, because it releases whenever it is not supplied with electric current.

Another disadvantage is that an air clearance, that is, a spacing between the brake lining and the brake body when the brake is released, increases with increasing wear of the brake linings. On the one hand, this makes an approach course of the brake lining until it contacts the brake body longer, and it also takes longer until the brake grips. The dynamic loss increases as well. Furthermore, the force necessary to overcome the force of the restoring spring increases, since the restoring spring is more severely deformed. The energy to be brought to bear by the electric motor of the actuation device for deforming the restoring spring is equivalent to the product of the deformation travel and the deformation force; that is, as the air clearance increases, it increases at least quadratically, which very considerably worsens the efficiency of the brake when the brake linings are worn.

SUMMARY AND ADVANTAGES OF THE INVENTION

The electromechanically actuatable brake of the invention has a releasable support of its actuation device. The actuation device is braced against this support upon actuation of the brake, or in other words for pressing the brake lining against the brake body. Upon braking and also upon release of the brake, the support acts solely as an immovable abutment and has no other function; the brake is both actuated and released again with its actuation device. Thus, the support affects neither the actuation device itself or its efficiency.

In the event of failure, such as failure of the power supply of the electric motor or of its electronic control unit, if the brake cannot be released by the actuation device, then the support is released, causing the actuation device together with the brake lining to be released from the brake body. In other words, the support acting as an abutment for the actuation device is removed, or at least its spacing from the brake body is increased. The invention has the advantage that its support does not affect the function of the actuation device or worsen its efficiency. In the event of a failure, a residual braking moment is prevented from acting, and it is assured that the brake is released completely.

BRIEF DESCRIPTION OF THE DRAWINGS

The invention will be described in further detail below in terms of an exemplary embodiment shown in the drawings. Shown are.

DETAILED DESCRIPTION OF THE EXEMPLARY EMBODIMENT

Figure 1:
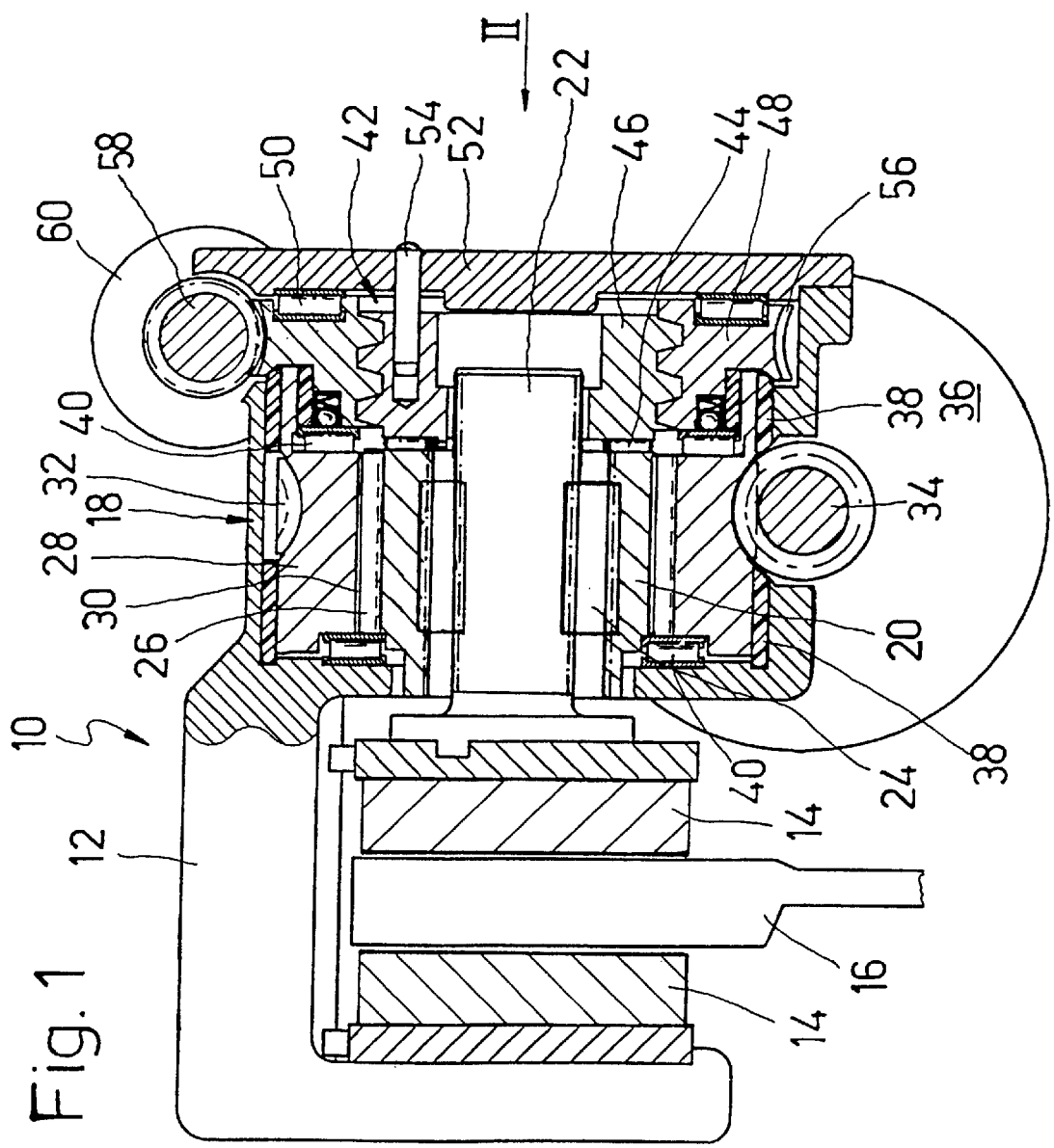
FIG. 1, a section through a brake according to the invention taken along the line I—I of FIG. 2.
Figure 2:
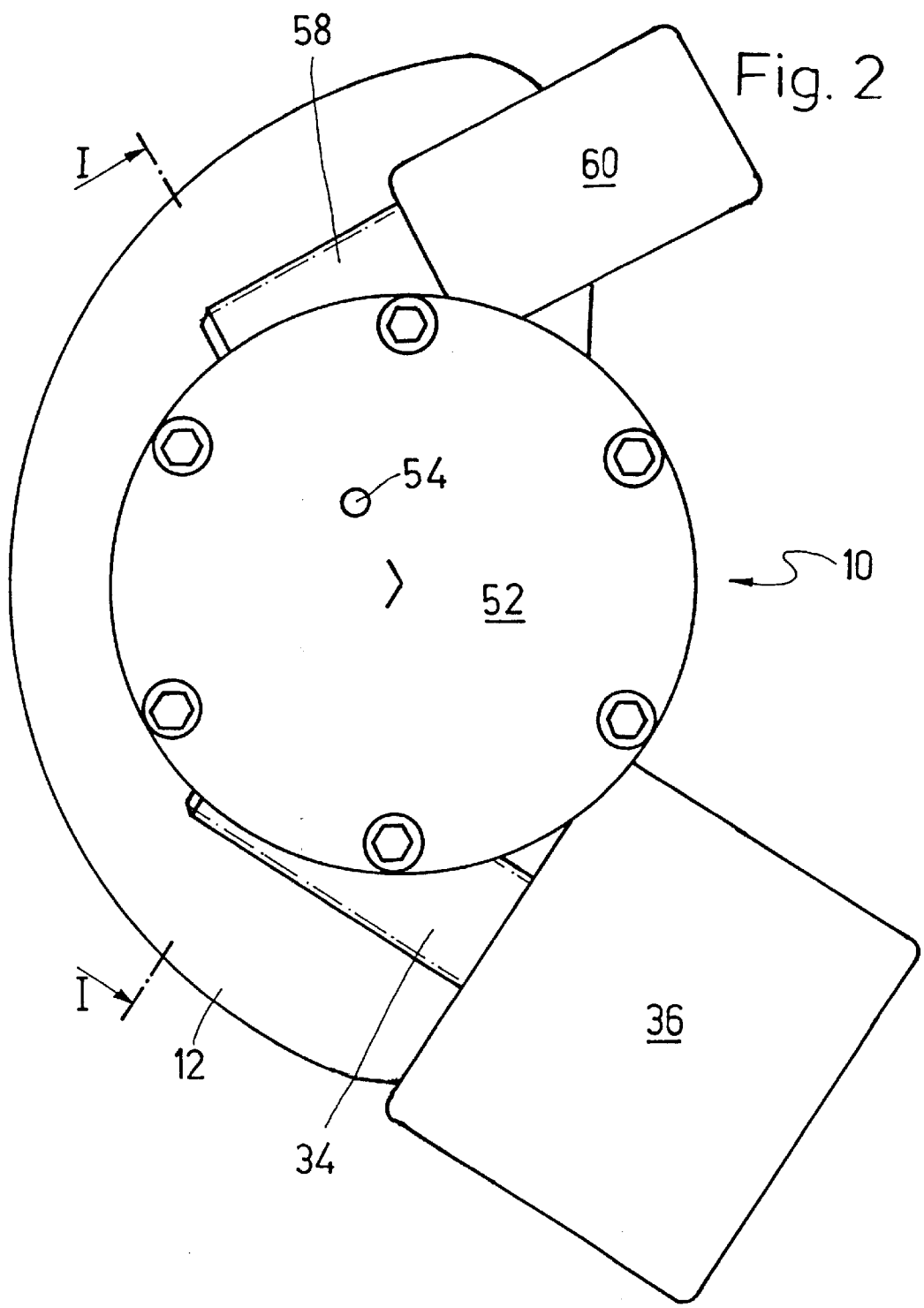
FIG. 2, an elevation view of the brake in the direction of the arrow II in FIG. 1.

The brake according to the invention shown in the drawing is embodied as a disk brake 10 with a so-called floating or sliding caliper 12, in which two brake linings 14 are disposed, each on one side of a brake disk 16 that can rotate between them.

As the actuation device, the disk brake 10 has a spindle drive, specifically, because of its good efficiency, a roller thread drive 18. The drive includes a nut 20, which coaxially surrounds a spindle 22. Threaded rollers 24 are distributed over the circumference in a cylindrical interstice between the nut 20 and the spindle 22, and their threads engage both the nut thread and the spindle thread. When the nut 20 is driven to rotate, the threaded rollers 24 travel like the planet wheels of a planetary gear around the spindle 22 and bring about an axial motion of the spindle 22. One of the two brake linings 14 is disposed on one face end of the spindle 22 in a manner fixed against relative rotation; driving the nut 20 to rotate can press this brake lining against one side of the brake disk 16, in order to bring a brake force to bear. The other one of the two brake linings 14 is pressed in a manner known per se, as a consequence of the reaction force of the brake caliper 12, against the other side of the brake disk 16. For releasing the brake 10, the nut 20 of the roller thread drive 18 is driven to rotate in the opposite direction.

For the rotational drive, the nut 20 has a splined toothing 26, onto which a cuff 28 is thrust as a transmission element; the cuff has a groove profile 30 in its bore complementary to the splined profile 26 of the nut 20. The nut 20 is thus connected axially displaceable and in a manner fixed against relative rotation to the cuff 20.

On its outer circumference, the cuff 28 is provided with toothing 32 extending all the way around, with which a threaded worm 34 of an electrical actuating motor 36 meshes. With the actuating motor 36, via the cuff 28, the nut 20 of the threaded roller drive 18 can be driven to rotate and thus the disk brake 10 of the invention can be actuated and released.

The cuff 28 is rotatably supported in the brake caliper 12 by two composite material radial slide bearings 38 as well as two axial needle bearings 40.

For releasing the brake 10 of the invention in the event of failure, such as failure of the actuating motor 36, its power supply, or an electronic brake unit, not shown, the brake 10 of the invention has a releasable support 42, against which the nut 20 of the roller thread drive 18 is rotatably braced in the axial direction via an axial needle bearing 44, in order to press the brake linings 14 against the brake disk 16. The support 42 forms a kind of a button for the roller thread drive 18 that forms the actuation device and that keeps the roller thread drive 18 at a predetermined spacing from the brake disk 16, on a side of the nut 20 remote from the brake disk 16. In the event of failure, this distance can be increased by releasing the support 42, so that the brake linings 14 no longer contact the brake disk 16.

In the exemplary embodiment, the releasable support 42 has a spindle drive with a trapezoidal-thread hollow spindle 46, onto which a trapezoidal nut 48 is screwed. The nut 20 of the roller thread drive 18 of the actuation device is braced against the trapezoidal-thread hollow spindle 46 via the axial needle bearing 44. The trapezoidal nut 48 is braced via a further axial needle bearing 40 against a cap 52, which is screwed together with the brake caliper 12. The trapezoidal-thread hollow spindle 46 is hollow in embodiment, so that it can receive a rear end, remote from the brake disk 16, of the spindle 22 of the roller thread drive 18 of the actuation device. By means of a cylindrical pin 54, which is inserted with a press fit eccentrically and axially parallel into the cap 52 and which with a clearance fit engages a blind bore of the trapezoidal-thread hollow spindle 46, the hollow spindle is secured against relative rotation.

The trapezoidal nut 48 has toothing 56 on the outside, with which a worm 58 of a second electric motor 60 meshes. The second electric motor 60 is connected to its own power supply, which is independent of the power supply of the actuating motor 36.

With the second electric motor 60, the trapezoidal nut 48 can be driven to rotate and in this way to release the support 42; that is, the trapezoidal-thread hollow spindle 46 is moved axially away from the brake disk 16. Together with it, the entire roller thread drive 18 of the actuation device, whose nut 20 is axially braced against the trapezoidal-thread hollow spindle 46 and which is axially displaceable in the cuff 28 by the splined shaft toothing 26, 30, moves away from the brake disk 16, so that the brake linings 14 are lifted from the brake disk 16, and the brake 10 of the invention is released.

Using a thread drive 46, 48 as the releasable support device 42 has the advantage that in the event of failure of the actuation device 18, the brake linings 14 can be lifted away from the brake disk 16, and thus will not, because of hysteresis when the support 42 is released, continue to rest on the brake disk 16 and cause a residual braking moment.

The foregoing relates to a preferred exemplary embodiment of the invention, it being understood that other variants and embodiments thereof are possible within the spirit and scope of the invention, the latter being defined by the appended claims.

What is claimed is:

1. An electromechanically actuatable brake, comprising an actuation device which is actuated by an electrical actuating motor, with said actuation device a brake lining is pressed against a brake body to be braked and said brake lining is lifted away from the brake body to a non-braking position, said actuation device has a releasable support assembly (42), said support assembly including a spindle drive means against which the actuation device (18) is braced upon pressing the brake lining (14) against the brake body (16), and the brake lining (14) pressed against the brake body is released from the brake body (16) by releasing the support assembly (42) free of an actuation by said motor.

2. A brake in accordance with claim 1, in which the actuation device has a spindle drive (18), a nut (20) is connected axially displaceably to said spindle drive and in a manner fixed against relative rotation to a transmission element (28), said transmission element is driven to rotate by the actuating motor (36).

3. A brake in accordance with claim 2, in which the spindle drive is a roller thread drive (18).

4. A brake in accordance with claim 2, in which the releasable support assembly (42) has a second spindle drive (46, 48), against which the actuation device (18) is braced and with which the brake lining (14) pressed against the brake body can be released from the brake body (16) together with the actuation device (18).

5. A brake in accordance with claim 3, in which the releasable support assembly (42) has a second spindle drive (46, 48), against which the actuation device (18) is braced and with which the brake lining (14) pressed against the brake body can be released from the brake body (16) together with the actuation device (18).

6. A brake in accordance with claim 4, in which the releasable support assembly (42) includes a second electric motor (60).

7. A brake in accordance with claim 5, in which the releasable support assembly (42) includes a second electric motor (60).

8. A brake in accordance with claim 6, in which the two electric motors (36, 60) are connected to two mutually independent power supplies.

9. A brake in accordance with claim 7, in which the two electric motors (36, 60) are connected to two mutually independent power supplies.

10. A brake in accordance with claim 1, in which the brake is a floating caliper disk brake (10).

11. A brake in accordance with claim 2, in which the brake is a floating caliper disk brake (10).

12. A brake in accordance with claim 3, in which the brake is a floating caliper disk brake (10).

13. A brake in accordance with claim 8, in which the brake is a floating caliper disk brake (10).

14. A brake in accordance with claim 6, in which the brake is a floating caliper disk brake (10).

15. A brake in accordance with claim 8, in which the brake is a floating caliper disk brake (10).

* * * * *